(12) United States Patent
Koch et al.

(10) Patent No.: US 7,646,166 B2
(45) Date of Patent: Jan. 12, 2010

(54) METHOD AND APPARATUS FOR MODELING DIFFUSION IN AN ELECTROCHEMICAL SYSTEM

(75) Inventors: Brian J. Koch, Berkley, MI (US);
Damon R. Frisch, Troy, MI (US);
Robert S. Conell, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 425 days.

(21) Appl. No.: 11/567,239

(22) Filed: Dec. 6, 2006

(65) Prior Publication Data

US 2008/0135316 A1 Jun. 12, 2008

(51) Int. Cl.
*H02J 7/14* (2006.01)

(52) U.S. Cl. .................. 320/104; 320/156; 324/427

(58) Field of Classification Search .............. 324/427; 320/104, 134, 136, 148, 156, 161
See application file for complete search history.

(56) References Cited

U.S. PATENT DOCUMENTS

| | | | |
|---|---|---|---|
| 6,016,047 A * | 1/2000 | Notten et al. | 320/137 |
| 6,639,385 B2 | 10/2003 | Verbrugge et al. | |
| 2001/0035739 A1 * | 11/2001 | Laig-Horstebrock et al. | 320/132 |
| 2004/0162683 A1 | 8/2004 | Verbrugge et al. | |

* cited by examiner

*Primary Examiner*—Edward Tso
*Assistant Examiner*—Aaron Piggush

(57) ABSTRACT

A method for determining a diffusion voltage in an electrochemical cell (e.g., a battery used in connection with an automotive vehicle) includes estimating a previous diffusion voltage, calculating a new diffusion voltage using an equation based on a diffusion circuit model and the previous diffusion voltage, and setting the previous diffusion voltage equal to the new diffusion voltage. The step of calculating the new diffusion voltage may then be repeated.

20 Claims, 3 Drawing Sheets

METHOD AND APPARATUS FOR MODELING DIFFUSION IN AN ELECTROCHEMICAL SYSTEM

TECHNICAL FIELD

The present invention relates to the field of motor vehicles and, more specifically, to a method and apparatus for modeling diffusion in an electrochemical system—for example, a battery system used in conjunction with a motor vehicle.

BACKGROUND OF THE INVENTION

Batteries are used in a wide range of motor vehicle applications. For example, the desire to improve fuel economy and reduce the amount of pollutants emitted by vehicles has led to the development of hybrid electric vehicles (HEVs) incorporating sophisticated battery systems.

There are several different types of HEVs. Parallel HEVs use both an internal combustion engine (ICE) and an electric motor to propel the vehicle, while serial HEVs use an electric motor to propel the vehicle and the ICE to generate electrical energy and run the electric motor. In a third type of HEV, known as a "start/stop" HEV, the ICE propels the vehicle and the electrical system is used to operate the vehicle when the vehicle is stationary. The ICE then restarts when the vehicle starts to move.

Common to all types of HEVs is a battery that undergoes various charge and discharge cycles as the battery powers the vehicle and/or vehicular components. It is important to know the state of the battery as expressed by the state of charge (SOC) of the battery. In order to make decisions regarding the battery, such as when to actively charge the battery, it is important to know the SOC of the battery.

Different methods have been developed to determine the SOC. One method to determine the SOC is based upon the use of an equivalent circuit of a battery system to model the battery. The equivalent circuit that models the battery accounts for factors such as the surface charge on the plates of the battery. Such a method and system is disclosed in U.S. Pat. No. 6,639,385, entitled "State of Charge Method and Apparatus," issued on Oct. 28, 2003, and U.S. Publication No. U.S. 2004/0162683, entitled "Method and Apparatus for Generalized Recursive Least-Squares Process for Battery State of Charge and State of Health," filed Feb. 8, 2003. While prior equivalent circuits provide an effective model for determining the SOC of the battery, these circuits fail to account for diffusion in the battery system.

Accordingly, it is desired to provide method and apparatus for modeling diffusion in an electrochemical system. Furthermore, the desirable features and characteristics of the present invention will be apparent from the subsequent detailed description and the appended claims, taken in conjunction with the accompanying drawings and the foregoing technical field and background.

SUMMARY OF THE INVENTION

In accordance with one embodiment of the present invention, a method for determining a diffusion voltage in an electrochemical cell comprises the steps of estimating a previous diffusion voltage, calculating a new diffusion voltage using an equation based on a diffusion circuit model and the previous diffusion voltage, and setting the previous diffusion voltage equal to the new diffusion voltage. The step of calculating the new diffusion voltage may then be repeated.

In accordance with another embodiment of the present invention, an energy management controller for a vehicle comprises a processor and a memory coupled thereto. The processor is configured to determine an initial diffusion voltage and calculate a diffusion voltage using an equation based on a diffusion circuit model and the estimated diffusion voltage. The processor is further configured to determine a battery condition parameter using the diffusion voltage. The memory is configured to store the battery condition parameter.

In accordance with another embodiment, a hybrid electric vehicle comprises an internal combustion engine, an electric motor generator configured for use as a generator to produce a charging voltage, and a battery coupled to the electric motor generator. An engine control computer is coupled to the internal combustion engine, the electric motor generator, and the battery. The engine control computer comprises a processor configured to estimate an initial diffusion voltage and calculate a diffusion voltage using an equation based on a diffusion circuit model and the initial diffusion voltage. The processor is further configured to determine a state of charge of the battery using the diffusion voltage. The engine control computer further comprises a memory coupled to the processor for storing a plurality of parameters regarding battery conditions.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
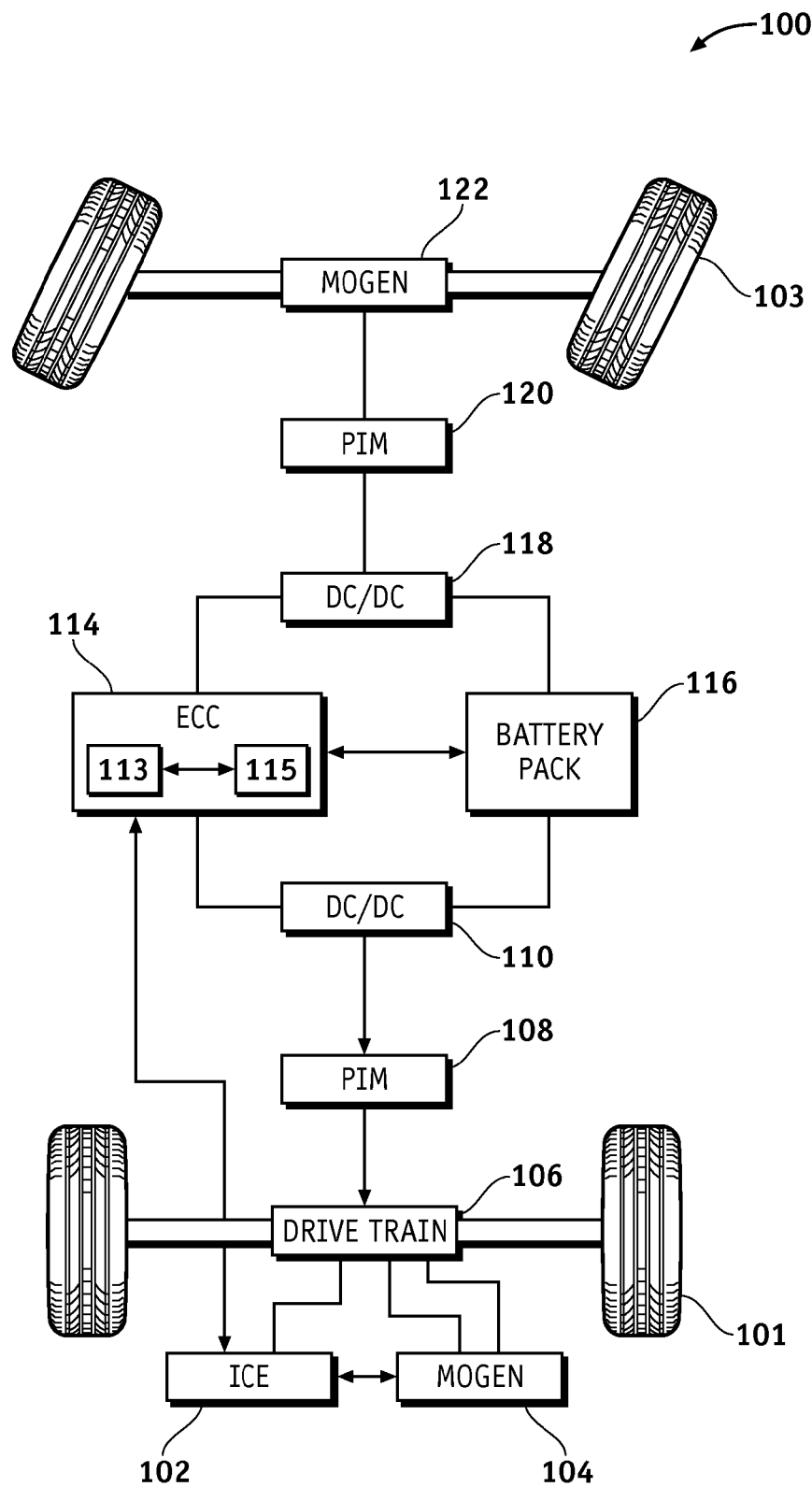
FIG. 1 illustrates a block diagram of an exemplary embodiment of a hybrid electric vehicle in accordance with the teachings of the present invention.

FIG. 1 is a block diagram of an exemplary embodiment of a hybrid electric vehicle (HEV) 100 useful in describing the present invention. As a preliminary matter, it should be noted that the invention may be implemented in the context of a variety of vehicle battery systems, and is not limited to HEV applications. Furthermore, in the exemplary embodiment of FIG. 1, HEV 100 is illustrated as a parallel HEV, although other types of HEVs are within the scope of the present invention.

HEV 100 comprises a first electric motor generator (MOGEN) 104 coupled to an internal combustion engine (ICE) 102, both of which are coupled to a drive train 106, which is coupled to the rear wheels 101. The first MOGEN 104 is coupled to the battery pack 116 via a first DC-to-DC converter 110 and a first power inverter module 108. An engine control computer (ECC) 114 is coupled to the ICE 102 and the first MOGEN 104 via first DC-to-DC converter 110 and first power inverter module 108. In one exemplary embodiment, an optional second MOGEN 122 is coupled to the front wheels 103. The second MOGEN 122 is coupled to a second power inverter module 120 and a second DC-to-DC converter 118.

First MOGEN 104 can function as a motor to propel HEV 100 or as a generator to charge battery pack 116. In FIG. 1, first MOGEN 104 operates the rear wheels 101 via drive train 106. Second MOGEN 122, in an exemplary embodiment, can be used to drive front wheels 103 via second power inverter module 120 and second DC-to-DC converter 118. While FIG. 1 illustrates first MOGEN 104 and second MOGEN 122 as single units, a separate motor and a separate generator can be provided for each.

ICE 102 can be used to propel the HEV 100. Additionally, ICE 102 can operate the first MOGEN 104 to generate an AC voltage. The AC voltage can be converted to a DC voltage by the first power inverter module 108 to charge the battery pack 116. ICE 102 can be any of the well-known ICEs 102 designed for use in a vehicle.

First DC-to-DC converter 110 can convert the AC voltage generated by first MOGEN 104 and inverted by first power inverter module 108 into a higher DC voltage needed to charge battery pack 116. The first DC-to-DC converter 110 can also step down voltage from the battery pack 116 when the battery pack 116 is used to run the first MOGEN 104.

ECC 114 operates as an energy management controller to monitor battery parameters and as a hybrid system controller to control the operation of vehicular components such as the first MOGEN 104, the second MOGEN 122, and the ICE 102. ECC 114, in one embodiment, monitors parameters such as the battery current, the battery voltage, the battery state of charge (SOC), internal resistance, power output and the like. ECC 114, in one exemplary embodiment, includes a processor 113 for determining, among other battery and system parameters, the diffusion voltage and the SOC. A memory 115 is coupled to the processor 113 and can store data such as a plurality of battery condition parameters. In the present invention, the diffusion voltage determined at the ECC 114 can be used in calculating the SOC or other battery condition parameters. ECC 114 can be a single controller or can be a combination of two or more separate controllers distributed throughout the HEV 100.

Battery pack 116 comprises a plurality of batteries connected, in a typical embodiment, in series. Battery pack 116 can be used to power the first MOGEN 104 to operate the drive train 106 or power the HEV 100. The battery pack 116 can be actively charged by the first MOGEN 104 and/or passively charged via a regenerative braking system (not pictured). In one exemplary embodiment, battery pack 116 comprises a plurality of nickel-metal hydride (NiMH) batteries, although other battery chemistry, such as lead-acid, lithium ion, lithium poly-ion and the like may be used.

Figure 2:
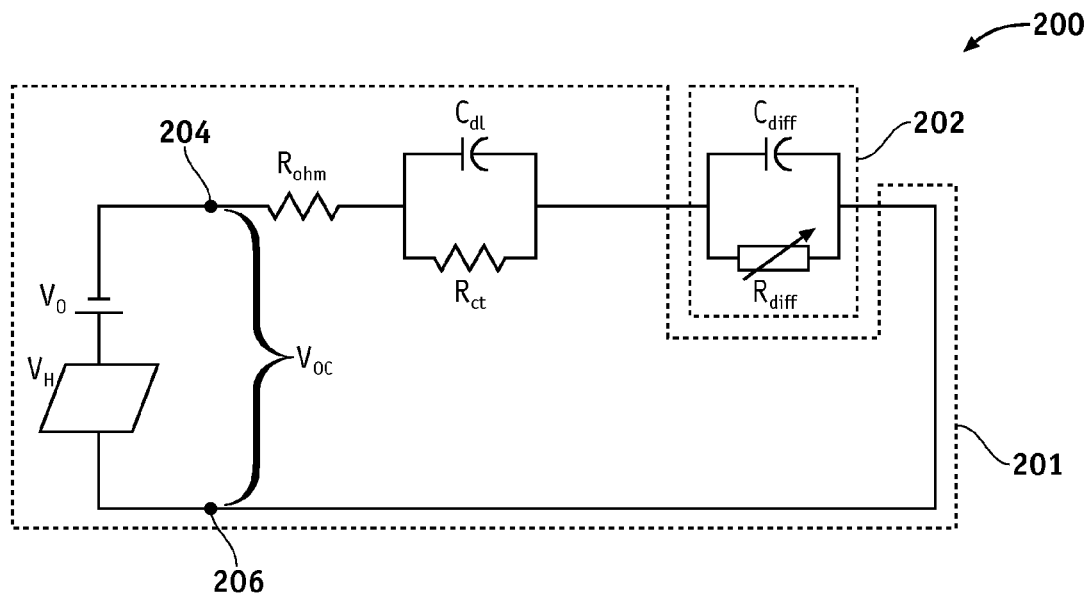
FIG. 2 is a circuit diagram of an exemplary embodiment of an equivalent circuit with a diffusion circuit element in accordance with the teachings of the present invention.

FIG. 2 illustrates an exemplary embodiment of a battery equivalent circuit 200 including a diffusion circuit element 202 and a conventional equivalent circuit 201. The conventional equivalent circuit 201 includes a hysteresis voltage source, $V_H$, in serial with a battery voltage source, $V_o$, and a series resistance, $R_{ohm}$. Between point 204 and 206, an open circuit voltage, $V_{oc}$, is defined. The open circuit voltage is equal to the sum of the hysteresis voltage source, $V_H$, and the battery voltage source, $V_o$. A capacitor, $C_{d1}$, is coupled in parallel with a resistance, $R_{ct}$.

The elements of conventional equivalent circuit 201 are part of a known conventional equivalent circuit that can be used to model the battery behavior and accounts for factors such as the surface charge on the plates of the battery. The conventional equivalent circuit 201 and its behavior is disclosed in U.S. Pat. No. 6,639,385, entitled "State of Charge Method and Apparatus," issued on Oct. 28, 2003, and U.S. Publication No. U.S. 2004/0162683, entitled "Method and Apparatus for Generalized Recursive Least-Squares Process for Battery State of Charge and State of Health," filed Feb. 8, 2003, which are hereby incorporated for all purposes.

The battery equivalent circuit 200 of the present invention includes a diffusion circuit element 202 to model the diffusion voltage in the battery. Diffusion circuit element 202 comprises a diffusion capacitor, $C_{diff}$ coupled in parallel to a variable resistance, $R_{diff}$. The variable resistance, $R_{diff}$, is a function of the charge on the diffusion capacitor, $U_{cap}$, which can be expressed as:

$$R_{diff} = f(U_{cap})$$ Eqn. 1

The diffusion circuit element 202 has a time constant, $\tau$, equivalent to the product of the diffusion capacitor and the variable resistance:

$$\tau = R_{diff} \times C_{diff}$$ Eqn. 2

Since the variable resistance, $R_{diff}$, is a function of the charge on the diffusion capacitor, $U_{cap}$, the time constant, $\tau$, will also vary as a function of the charge on the diffusion capacitor, $U_{cap}$. Therefore, the behavior of the diffusion circuit element 202 can be related to the time constant, $\tau$.

The diffusion circuit element 202 models the diffusion process in an electrochemical cell. Diffusion is the movement of ions in response to a concentration gradient. Transport of the diffusing ions occurs from areas of high concentration to areas of low concentration at a rate that is directly proportional to the diffusivity of the ions and the magnitude of the gradient. In an electrochemical process, a gradient is created by the conversion of a reactant to a product at an electrode. For example, in a lead acid battery, the reaction at the anode on discharge of the battery is:

$$Pb + SO_4^{2-} \Leftrightarrow PbSO_4 + 2e^-$$ Eqn. 3

In other words, in this example, the reactants, Pb (lead) and $SO_4^{2-}$ (sulfate anion), are converted to the product, $PbSO_4$ (lead sulfate). As the $SO_4^{2-}$ reactant nearest the electrode is consumed to form solid $PbSO_4$, more $SO_4^{2-}$ from the bulk of the electrolyte in the battery moves in to replenish the consumed $SO_4^{2-}$. If the rate at which $SO_4^{2-}$ is consumed at the electrode exceeds the rate at which the $SO_4^{2-}$ can diffuse from the electrolyte to the electrode, the local concentration of $SO_4^{2-}$ at the surface of the electrode will decrease as the reaction proceeds. The difference between the local concentration of $SO_4^{2-}$ and the concentration of $SO_4^{2-}$ in the rest of the electrolyte forms a gradient that provides the driving force for diffusion. The extent to which the gradient develops depends upon the rate of reaction at the electrode and the diffusivity of the diffusing species. Gradients can develop in liquid, solid or gas phases in the system, depending upon the nature of the electrochemical reaction and the design of the electrochemical cell.

In electrochemical cells, the concentration gradients in the diffusing species that are responsible for energy storage and release are manifested as voltage transients that can be acquired at the electrical terminals of the electrochemical cell. The magnitude and rates of change of the voltage transients are proportional to the diffusivity of the reacting species and the magnitude of the gradients. The larger the magnitude of the gradients, the larger and faster changing the voltage transients and the smaller the magnitude of the gradients, the smaller and slower changing the voltage transients.

Figure 3:
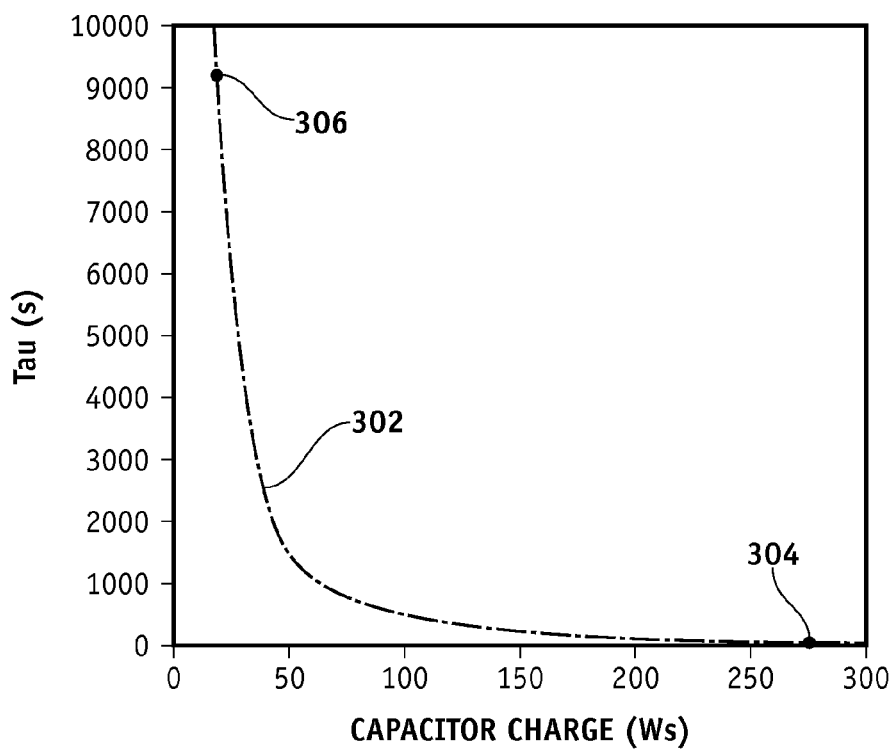
FIG. 3 is a graph illustrating the relationship between the charge on the capacitor and the time constant in accordance with the teachings of the present invention.

The diffusion circuit element 202 models this behavior as shown in FIG. 3, which is a graph 302 depicting the exponential relationship between the charge on the diffusion capacitor, $U_{cap}$, and the time constant, $\tau$. For example, at point 304 on the graph 302 there is a large charge on the diffusion capacitor at a low time constant, $\tau$, value. The large charge on the diffusion capacitor at the low time constant value represents a large, fast-changing voltage occurring within the diffusion circuit element 202. This is representative of a large gradient.

Point 306 on the graph 302 represents a low charge on the diffusion capacitor when the time constant is large. This represents a small gradient. The relationship between the time constant, $\tau$, and the charge on the diffusion capacitor, $U_{cap}$, between the two extreme values is allowed to vary exponentially.

A diffusion voltage, $V_{diff}$, in the diffusion circuit element 202 can be represented by the following diffusion voltage equation:

$$V_{diff} = IA_{diff}\Delta t + \exp\left(-\frac{\Delta t}{\tau_{t-\Delta t}}\right) \times V_{diff, t-\Delta t} \qquad \text{Eqn. 4}$$

where I is the current flowing through the diffusion circuit element 202 at the time $\Delta t$, $A_{diff}$ is the reciprocal of the diffusion capacitor ($1/C_{diff}$), $\tau_{t-\Delta t}$ is the value of time constant from a previous time step, and $V_{diff}$, $t-\Delta t$ is the value of the diffusion voltage from a previous time step. The calculation of the time constraint, $\tau$, begins with the calculation of the charge on the capacitor:

$$U_{cap} = \frac{1}{2A_{diff}} V_{diff}^2. \qquad \text{Eqn. 5}$$

The value of the charge on the capactior is then used in the calculation of the time constant, $\tau$:

$$\tau = \tau_{intercept} \times U_{cap}^{\tau_{exponent}} \qquad \text{Eqn. 6}$$

The calculated value of the time constant, $\tau$, from Eqn. 6 is typically bounded between some minimum and maximum value before it is used in Eqn. 4.

The values for $A_{diff}$, $\tau_{intercept}$, and $\tau_{exponent}$ in one exemplary embodiment, can be taken from look-up tables constructed from experimental data obtained for the electrochemical system of interest. The values may be functions of the temperature, state of charge, and age of the electrochemical system. These values can be stored in the memory 115 of the ECC 114. In one exemplary embodiment, the diffusion voltage equation (Eqn. 4) can be used with battery state algorithms that can extract needed parameters. In this embodiment, the algorithm can adapt the values of $A_{diff}$ and $\tau_{exponent}$ in response to changes in temperature, SOC and age of the electrochemical system, rather than using look-up tables.

In order to calculate the diffusion voltage, $V_{diff}$, an initial value for the diffusion voltage is required at the first time step of operation to start the calculation of the diffusion voltage. In one exemplary embodiment, the initial value of the diffusion voltage can be estimated by first observing the change in the voltage of the electrochemical system during periods of rest at an open circuit. For example, in a vehicle application, the last measured open circuit voltage at the time the vehicle is powered down (key-off) and the first measured open circuit voltage when the vehicle is powered on (key-on) can be used to estimate the initial diffusion voltage. An elapsed time between the key-off state and the key-on state, $t_{off}$, can also be used to find the initial diffusion voltage.

Figure 4:
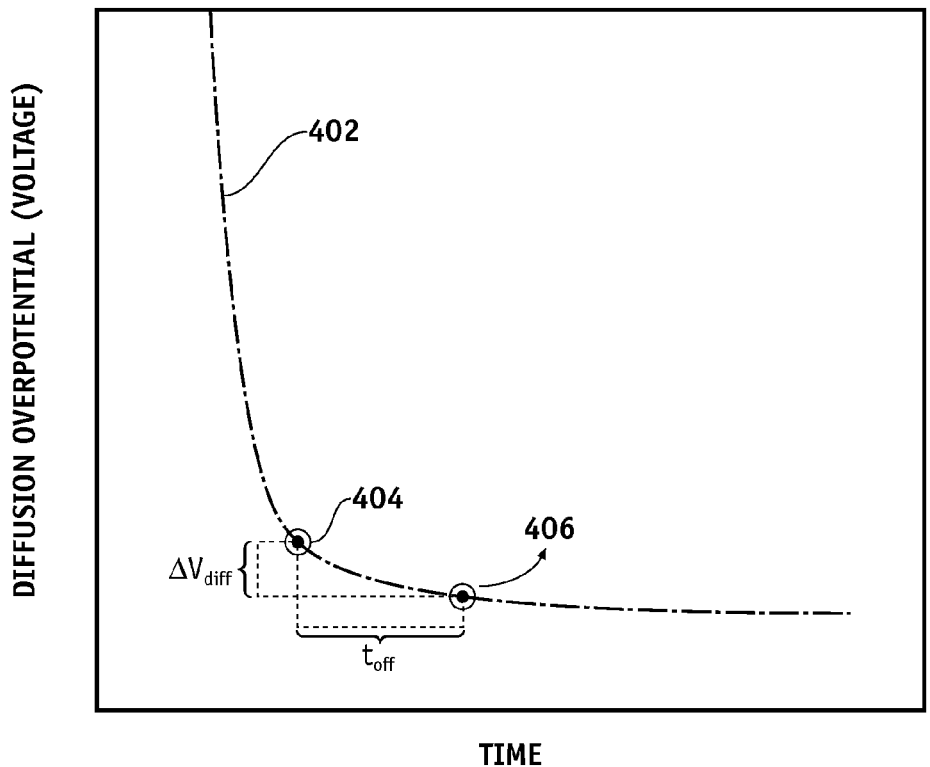
FIG. 4 is a graph illustrating the relationship between diffusion voltage and elapsed time in accordance with the teachings of the present invention.

After the elapsed time between the key-off state and the key-on state is determined, the initial value of the diffusion voltage can be estimated. FIG. 4 illustrates a curve 402 of diffusion voltage, $V_{diff}$, vs. time, t. Curve 402 illustrates the decay of the diffusion voltage $V_{diff}$ from a very high value to a very small value over time at an open circuit. The difference between any two measured open circuit voltages ($\Delta V$) over the elapsed time ($t_{off}$), such as the difference between the open circuit voltage between key-off and key-on, can be mapped on to the curve 402. A given combination of $\Delta V$ and $t_{off}$ will coincide with the curve 402 in one unique position, with the initial value of $V_{diff}$ at power-up corresponding to the intersection of the data with the curve at the end of the time interval $t_{off}$. For example, in one exemplary embodiment, point 404 of curve 402, represents the diffusion voltage measured the last time the vehicle was turned off (key-off) and point 406, of curve 402, represents the diffusion voltage measured when the vehicle is started after the last time the vehicle was turned off (key-on). The voltage at point 406 would represent the initial diffusion voltage.

One way to determine an initial diffusion voltage is to select a high value of the diffusion voltage, $V_{diff}$, on the curve 402 and to calculate an expected ending diffusion voltage value after the time, $t_{off}$, has elapsed. The difference in these two values of diffusion voltage is compared to the difference in two measured values of voltage taken at the last key-off time and last key-on time as discussed previously. If the two differences match within some predetermined tolerance level, then the calculated value of diffusion voltage after an elapsed time period can be used as the initial value of the diffusion voltage for Eqn. 4.

If the two differences do not match within the predetermined tolerance level, then the calculation is repeated with the starting value of diffusion voltage selected lower on the curve 402. The process is repeated by decrementing the starting value of the diffusion voltages, $V_{diff}$, on the curve by a certain predetermined amount until a match between the calculated difference between the diffusion voltage, $V_{diff}$, values and the measured difference between the voltages at key-off time and key-on time is found. If the calculated ending value of the diffusion voltage reaches a small value after many iterations and no match has been found, then the initial diffusion voltage takes on a default value of "0" V. In order to reduce the amount of time required to find the initial diffusion voltage, more sophisticated search routines may be employed to find a match between the measured data and the curve 402 and are within the teachings of the present invention.

Figure 5:
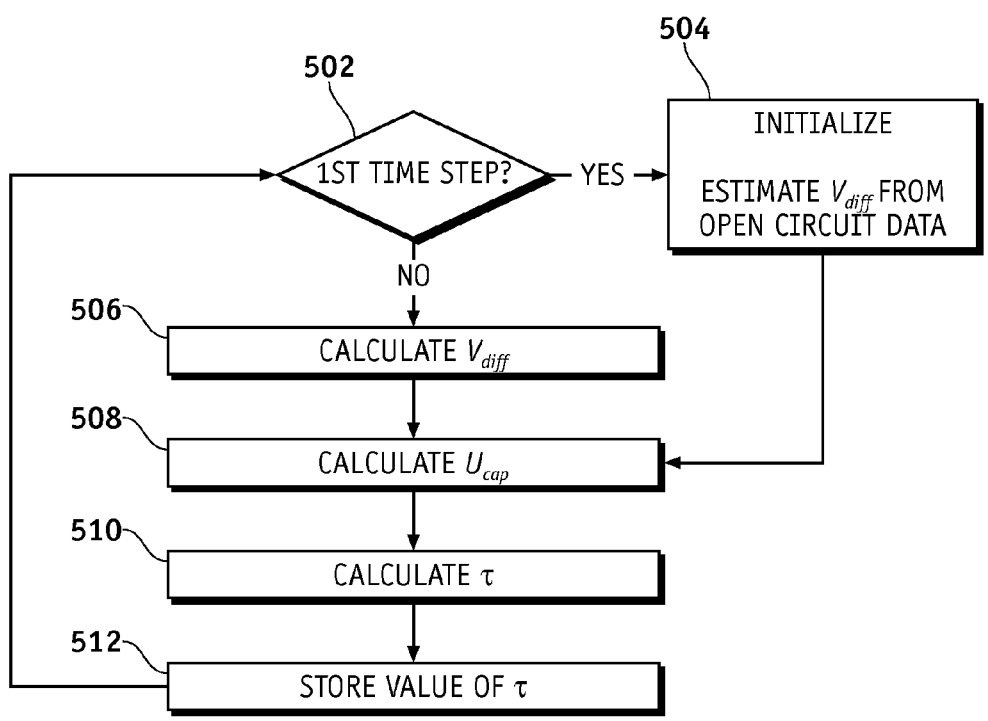
FIG. 5 is a flowchart of an exemplary method for determining diffusion voltage ($V_{diff}$) in accordance with the teachings of the present invention.

FIG. 5 is a flowchart illustrating an exemplary method for calculating the diffusion voltage, $V_{diff}$, in a battery pack 116. In a first step, step 502, it is first determined if it is the first time the diffusion voltage has been calculated since the vehicle has been started.

If it is the first time the diffusion voltage has been calculated since the vehicle has been started, in step 504, an initial diffusion voltage is estimated. In one exemplary embodiment, the initial diffusion voltage can be estimated using the method discussed above in conjunction with FIG. 4. After the initial diffusion voltage is estimated, the method proceeds to step 508, which is discussed in detail below.

If it is not the first time the diffusion voltage has been calculated since the vehicle has been started, at step 506, the diffusion voltage is calculated using Eqn. 4. Eqn. 4 utilizes a previous value of the diffusion voltage to calculate a current diffusion voltage. The necessity of a previous value of the diffusion voltage to calculate a current value is why an initial diffusion voltage is estimated in step 504.

In step 508, which is reached either after step 504 when an initial diffusion voltage is calculated or after step 506 when a current diffusion voltage is calculated using a previous diffusion voltage, the charge on the capacitor, $U_{cap}$, is calculated using Eqn. 5. The charge on the capacitor, $U_{cap}$, determined in step 508, is then used in step 510 to calculate the time constant, $\tau$, using Eqn. 6. The calculated time constant, $\tau$, is stored for further use in step 512.

In one exemplary embodiment, the time constant, $\tau$, is stored in memory 115, along with other parameters related to battery condition. Additionally, in one embodiment, the calculations performed in steps 504-510 are done using the processor 113 of the ECC 114

The conventional equivalent circuit 201 along with the diffusion circuit element 202, can then be used to determine an equation for the overall voltage in the battery:

$$V = V_0 + IR + \frac{I \Delta t}{C_D} + \exp\left(-\frac{\Delta t}{R_{ct} C_D}\right)(V - V_{OC} - IR - V_{diff})_{t-\Delta t} + V_{diff} + V_H \qquad \text{Eqn. 7}$$

This equation can be used as a recursive equation to determine the battery voltage.

The state of charge in the battery can be determined by using the relationship:

$$SOC = w(SOC_c) + (1-w)SOC_v \qquad \text{Eqn. 8}$$

where w is a weighting factor, $SOC_c$ is a state of charge calculated by Coulomb integration and $SOC_v$ is the state of charge based on voltage. The $SOC_c$ can be determined using an integration method and an equation for the $SOC_v$ can be derived from the overall voltage in the battery. The derivation of such equations is disclosed in U.S. Pat. No. 6,639,385, entitled "State of Charge Method and Apparatus," issued on Oct. 28, 2003, and U.S. Publication No. U.S. 2004/0162683, entitled "Method and Apparatus for Generalized Recursive Least-Squares Process for Battery State of Charge and State of Health," filed Feb. 8, 2003. In these references, the calculations are done without considering the calculation of the diffusion voltage. In the present invention, the model includes the voltage contributed by diffusion and the equations can be adapted to account for the diffusion voltage.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. An energy management controller for a vehicle comprising:
    a processor configured to:
        estimate an initial diffusion voltage,
        calculate a diffusion voltage using an equation based on a diffusion circuit model and the estimated initial diffusion voltage, and
        determine a battery condition parameter using the diffusion voltage, wherein to estimate the initial diffusion voltage, the processor is further configured to:
            determine a first voltage as a difference between a key-off voltage measured when the vehicle is turned off and a key-on voltage measured when the vehicle is turned on,
            select a starting diffusion voltage based on a predetermined curve of diffusion voltage versus time,
            determine a determined diffusion voltage based on the first diffusion voltage and an elapsed time between when the vehicle is turned off and when the vehicle is turned on, and
            estimate the initial diffusion voltage as the determined diffusion voltage if the difference between the starting diffusion voltage and the determined diffusion voltage matches, within a predetermined amount, the first voltage; and
    a memory coupled to the processor, the memory configured to store the battery condition parameter.

2. The controller of claim 1 wherein the diffusion circuit model comprises a diffusion capacitor coupled to a variable resistance.

3. The controller of claim 2 wherein the variable resistance varies based on a charge on the diffusion capacitor.

4. The controller of claim 3 wherein the equation based on the diffusion circuit model includes a time constant that varies based on the charge on the diffusion capacitor.

5. The controller of claim 4 wherein the time constant and the charge on the diffusion capacitor are related with a decreasing exponential relationship.

6. The controller of claim 1 wherein the battery condition parameter is a state of charge of a corresponding battery.

7. The controller of claim 1, wherein the processor is further configured to relate the diffusion voltage to an overall voltage of an associated battery.

8. The controller of claim 7, wherein the processor is further configured to estimate a state of charge based on the overall voltage.

9. An apparatus for determining a diffusion voltage in an electrochemical cell, comprising:
    means for estimating an initial diffusion voltage;
    means for calculating a diffusion voltage using an equation based on a diffusion circuit model and the estimated initial diffusion voltage; and
    means for determining a battery condition parameter using the diffusion voltage, wherein the means for estimating the initial diffusion voltage comprises:
        means for determining a first voltage as a difference between a key-off voltage measured when a vehicle is turned off and a key-on voltage measured when the vehicle is turned on,
        means for selecting a staffing diffusion voltage based on a predetermined curve of diffusion voltage versus time, means for determining a determined diffusion voltage based on the first diffusion voltage and an elapsed time between when the vehicle is turned off and when the vehicle is turned on, and means for estimating the initial diffusion voltage as the determined diffusion voltage if the difference between the starting diffusion voltage and the determined diffusion voltage matches, within a predetermined amount, the first voltage; and a memory coupled to the processor, the memory configured to store the battery condition parameter.

10. The apparatus of claim 9 wherein the diffusion circuit model comprises a diffusion capacitor coupled to a variable resistance.

11. The apparatus of claim 10 wherein the variable resistance varies based on a charge on the diffusion capacitor.

12. The apparatus of claim 11 wherein the equation based on the diffusion circuit model includes a time constant that varies based on the charge on the diffusion capacitor.

13. The apparatus of claim 12 wherein the time constant and the charge on the diffusion capacitor are related with a decreasing exponential relationship.

14. The apparatus of claim 9, further comprising:
means for relating the diffusion voltage to an overall voltage of an associated battery; and
means for estimating a state of charge based on the overall voltage.

15. A method for determining a diffusion voltage in an electrochemical cell, comprising the steps of:
estimating, by a processor, an initial diffusion voltage;
calculating, by the processor, a diffusion voltage using an equation based on a diffusion circuit model and the estimated initial diffusion voltage; and
determining, by the processor, a battery condition parameter using the diffusion voltage, wherein the step of estimating the initial diffusion voltage comprises the steps of:
determining a first voltage as a difference between a key-off voltage measured when a vehicle is turned off and a key-on voltage measured when the vehicle is turned on,
selecting a starting diffusion voltage based on a predetermined curve of diffusion voltage versus time,
determining a determined diffusion voltage based on the first diffusion voltage and an elapsed time between when the vehicle is turned off and when the vehicle is turned on, and
estimating the initial diffusion voltage as the determined diffusion voltage if the difference between the starting diffusion voltage and the determined diffusion voltage matches, within a predetermined amount, the first voltage.

16. The method of claim 15 wherein the diffusion circuit model comprises a diffusion capacitor coupled to a variable resistance.

17. The method of claim 16 wherein the variable resistance varies based on a charge on the diffusion capacitor.

18. The method of claim 17 wherein the equation based on the diffusion circuit model includes a time constant that varies based on the charge on the diffusion capacitor.

19. The method of claim 18 wherein the time constant and the charge on the diffusion capacitor are related with a decreasing exponential relationship.

20. The method of claim 15, further comprising the steps of:
relating the diffusion voltage to an overall voltage of an associated battery; and
estimating a state of charge based on the overall voltage.

* * * * *